May 26, 1936.  E. A. STALKER  2,041,793
SLOTTED WING
Original Filed Sept. 1, 1934   3 Sheets-Sheet 1

INVENTOR
Edward A. Stalker

May 26, 1936.  E. A. STALKER  2,041,793
SLOTTED WING
Original Filed Sept. 1, 1934   3 Sheets-Sheet 2
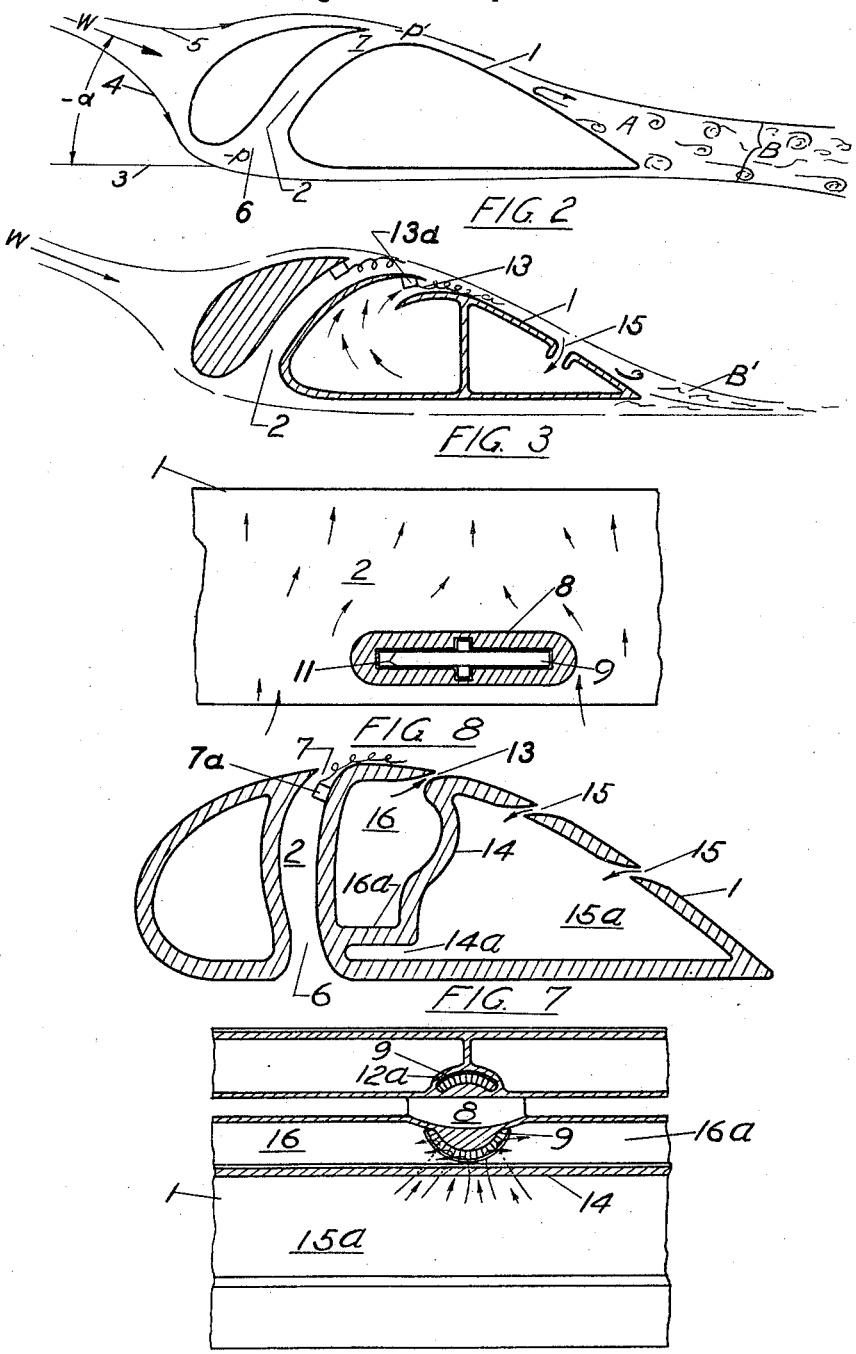

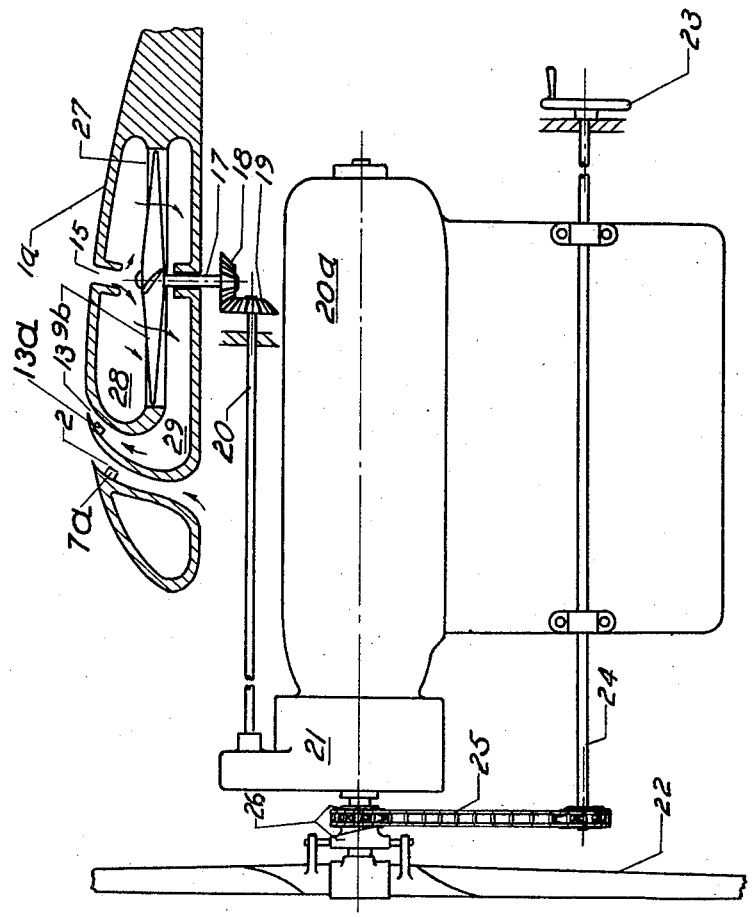
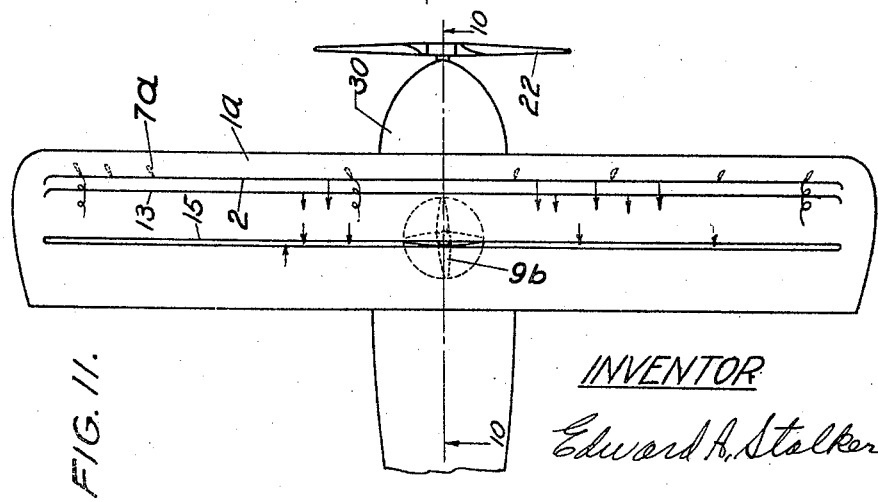

Patented May 26, 1936

2,041,793

UNITED STATES PATENT OFFICE 2,041,793

SLOTTED WING

Edward A. Stalker, Ann Arbor, Mich.

Application September 1, 1934, Serial No. 742,401
Renewed March 12, 1936

15 Claims. (Cl. 244—12)

My invention relates to improvements in slotted wings and other aerodynamic bodies and the object is to provide means to reduce their resistance. Other objects will appear from the detailed description of the invention. This application contains material in common with my application Serial No. 597,993 filed March 10, 1932 entitled Boundary layer control for wings, in which subdivision was required, and also with my application filed July 21, 1934 Serial No. 736,378. Application Serial No. 726,112 also contains some related material dealing with specific slot forms and airfoil sections and their use in propulsion of aircraft.

I attain these objects by the devices illustrated in the accompanying drawings in which—

Figures 1, 2, 3 represent the flow about airfoil sections and pertain to the theory;

Figure 7 is a vertical cross section along the line 7—7 in Figure 4;

Figure 8 is a fragmentary vertical spanwise section taken through the slot along line 8—8 in Figure 6;

Figure 9 is a fragmentary cross section taken along line 9—9 in Figure 6, the section extending spanwise;

Figure 10 is an alternative form of the invention and shows an elevation partly in section of the power plant and wing of an airplane. For clearness the supporting structures for the engine and wing are omitted. The section is along the line 10—10 in Figure 11;

Figure 11 is a top plan of the wing showing its relation to the rest of the airplane which appears in part in the figure.

Similar numerals refer to similar parts throughout the several views.

Figure 1:
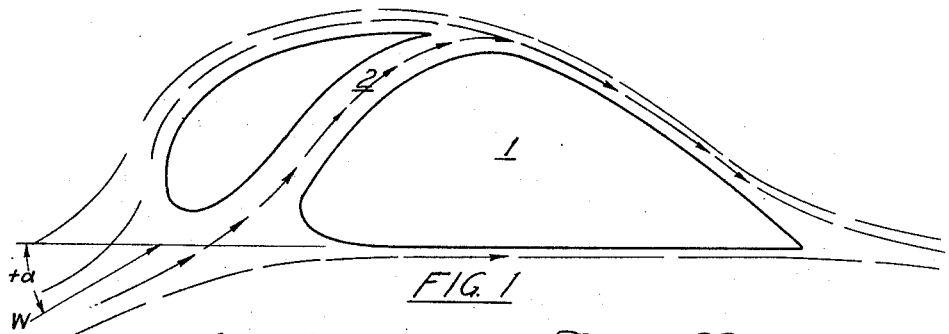

It is well known that a high lifting capacity can be obtained in a wing with a through slot 2 extending along the span to convey the relative flow of air below the wing 1 to its upper side, as in Figure 1. Such wings have been known many years, in fact since about 1920, but they have not come into use because of their high drag at the low angles of attack which are always used for high speed flight of any airplane. Means to close the slots have been used but these devices add weight and complexity and in a structure as flexible as the airplane's they always present hazards of functioning.

The use of a through slot extending along the span is in fact a use of a means to energize the boundary layer.

The boundary layer of air is normally a relatively thin layer of air adjacent the surface of the body and possessed of an appreciably lower velocity than would be the case were the fluid free from viscosity. At a little distance out from the body the flow has the local velocity that it should have were no rubbing on the body surface present. The layer of fluid between the body and the locus of normal local velocity is called the boundary layer.

The boundary layer plays an important part in the maximum lifting capacity of wings because it is the phenomena of the boundary layer which set a maximum value to the maximum lift attainable.

The boundary layer thickens toward the trailing edge of the wing due to its continual loss of energy from the rubbing on the surface. At high angles of attack there is a large suction over the nose of the wing and at some rather large angle this suction effect exceeds the rearward pressure of the boundary layer due to its momentum and the flow in the boundary layer is reversed. If the energy of the flow, that is the momentum, were not destroyed no reversal could occur. When the reversal occurs the lift no longer increases with increasing angle of attack and the flow above the wing becomes turbulent, producing a high drag.

The reversal in the boundary layer may be eliminated by suppressing the boundary layer. This may be done by putting openings in the surface and through these inducting the boundary layer so that it is eliminated as a trouble maker. Another method is to blow rearward along the wing surface so as to add energy to the boundary layer and thereby suppress it. However, in either the blowing or suction case energy is added to the layer and both methods are spoken of as boundary layer energization.

The slotted wing is a form of the blowing type in which the high pressure below the wing is used to form the jet discharged rearward along the upper surface.

The energization of the boundary layer by the through slot leads to an increase of maximum lift coefficient of about 50 to 60 per cent so that the slot is very desirable for the landing condition, that is, at large angles of attack. However, at small angles the wing with the slot has about twice the drag of a wing without a slot. Hence the slot has not come into any appreciable use. In addition to one slot many slots have been tried either with the hope of increasing the lift out of proportion to the increase of drag or to reduce the drag. The addition of slots is an application of more boundary layer energization and since no results have been obtained in reducing the drag for a given lift it has not been realized that what is needed is a unique combination of different means of boundary layer energization. In fact no theory has been advanced to account for the cause of the increase of drag which is out of all proportion to the increase in wing area exposed to the relative wind due to the slot.

I have found that the great increase of drag at low angles of attack is due to the peculiar pressure distribution about the wing which leads to the introduction of air of low energy content into the region above the wing at low angles of attack. For instance, in Figure 2 with the relative wind along the vector W at an angle $-\alpha°$ to the chord line 3 there are two regions of pressure lower than that of the surrounding atmosphere. I have indicated these regions as $-p$ and $-p'$ both resulting from the fact that the flow lines are curved outward from the wing in the vicinity of $-p$ and $-p'$. I have indicated the flow lines by 4 and 5.

At this low angle of attack $-\alpha$ the magnitude of $-p'$ is less than that of $-p$. In other words air tends to be sucked from $-p$ to $-p'$ through the slot 2. It is important to note that the region at $-p$ is shielded by the nose of the wing from the impact pressure of the wind and so the entrance 6 is not subject to the impact pressure as was the case at large angles of attack in Figure 1. Thus the region at the exit 7 of the slot receives through the slot air of low energy content per unit of volume. When this low energy air is mixed with the flow above the wing there is a drop in energy content per unit volume of air above the wing. The result is just the same as though the energy had been lost by rubbing. The flow fails to follow the wing contour as indicated in Figure 2 and the turbulent low pressure region A develops. The lowness of static pressure at A and in the ensuing wake B acts on the wing to pull it rearward. This is the cause of the high drag of slotted wings.

I find that I can remedy this undesirable condition by the application of boundary layer energization applied to the wing through a surface slot, either as suction or blowing. Both means are illustrated in Figure 3 which also illustrates how the wake B' is reduced to negligible proportions as compared to Figure 2.

Figure 4:
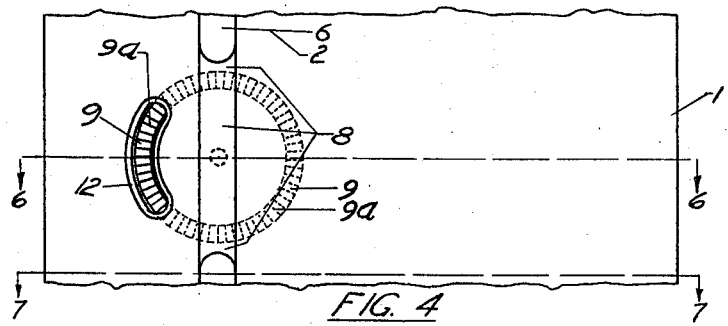
Figure 4 is a fragmentary plan view of the lower surface of the wing.

In practice I carry out the invention as illustrated in Figures 4 to 11. Referring first to the cross section shown in Figure 6, the wing is indicated by 1 as before. The through slot is 2 with inlet 6 and exit 7, and as shown in Figures 4 and 8 the slot is interrupted at intervals near the under surface of the wing by the wing portions 8. This portion of the wing is to house the rotor 9 mounted in the wing on the rotatable shaft 10. That is, the wing portion 8 is recessed at 11 to accommodate the rotor and shaft. As shown in Figure 8 the ends of the wing portions 8 are well rounded to guide the slot flow and distribute it spanwise so that the efflux from the slot exit 7 is fairly uniform along the wing span.

Ahead of the slot 2 is an opening 12 leading by the passage 12a through the wing to the upper surface. The blades 9a of the rotor 9 pass successively through the passage 12a under the action of the high velocity flow through the passage.

At the rear of the through slot there is an upper surface slot 13 formed for the discharge of fluid rearward tangentially along the upper surface. A wall 14 forms a barrier to communication between the surface slot 13 and the induction openings 15 except through the rotor blades in the passage 16 leading to the surface slot 13.

The action is as follows. The flow in the passage 12a drives the rotor as a turbine and the turbine blades in passing through the passage 16 act as pump or fan blades which induct air at the openings 15 and discharge it at 13. Thus the boundary layer including the air drawn up through 2 is energized at the rear of the through slot, and the resistance of through slot is greatly reduced. A number of the turbines should be located along the span and the large cross section of the passage 16 serves to distribute the pump discharge spanwise.

The wall 14 does not extend to the lower wall of the wing but there is a gap 14a between the end of 14 and the lower wall of the wing. The passage 16 has the wall 16a extending along the lower edge of the wall 14 but the wall 16a is cut out in arcuate form to accommodate the rotor 9. Thus the interior communication between the compartment 16 and the rear compartment 15a of the wing is through the rotor only.

The flow of air from the exit of passage 12a will have a low energy content because of the extraction of energy by the turbine. Hence the discharge from the passage 2 and the slot 13 will serve to interpose a layer of air between the wing and the discharge from 12a so as to prevent the reversal in the boundary layer and the consequent turbulent condition. This is important at both low and high angles of attack.

When air is blown out a wing surface slot for the purpose of energizing the boundary layer, the velocity of the discharged jet and hence its kinetic energy is larger than for the flow through a through slot due to the pressure distribution about the wing for the same increase in maximum lifting capacity. The cause of this discrepancy has been a mystery in aerodynamics. The explanation is to be found in the type of turbulence created in the boundary layer of the wing by the flow through the through slot and over the upper surface of the front portion of the wing, the portion ahead of the through slot. This turbulence is a very fine turbulence or system of rollers extending spanwise and does not resemble the large violent eddies accompanying the so-called burbling when the lift of a wing reaches a maximum. Rather the turbulence has a fine texture with an appreciable rotary velocity so that particles of air are alternately moving up and down in the boundary layer and transporting momentum from the free or high energy stream above the boundary layer into the boundary layer. This transportation of momentum speeds up the boundary layer and delays the burbling of the wing until a much higher angle of attack than normal is reached. These horizontal rollers are created with greater strength than on an unslotted wing for the following reason.

On a normal wing the dividing point for the flows going over and under the wing is quite near the leading edge. Hence the flow going over the upper surface has a small distance in which to roll up a vortex with the aid of friction on the wing surface. Where a through slot is employed the dividing point is further back on the lower surface and the flow going over the upper surface has a longer path and a higher velocity about the nose with the result that a strong spanwise vortex is rolled up. These strong vortices because the particles in them have velocities normal to the surface transport momentum from the main flow above down into the boundary layer close to the wing of which layer they are a part.

I find that by combining the through slot with its fine texture turbulence with the slot for the fluid blown out of the wing interior by a fan I can increase the maximum lift to values whose ratio to the energy used is comparable to the ratio of lift of the through slot alone to the energy in the flow through the through slot. This result occurs because the fine texture turbulence from the front portion of the wing has sufficient vigor to transport the energy of the fan-blown fluid down close to the wing surface as well as to transport the energy of the relative wind above the boundary layer into the boundary layer. The boundary layer of which I now speak is, of course, formed by the retarded portion or stratum of the fan-blown air. The result of these transportations of momentum is a steep gradient outward from the wing surface of the velocity and a consequent suppression of the magnitude of the boundary layer. It is to be noted that the fan-blown air is to have a higher velocity than the normal local stream above the wing outside the normal boundary layer. Thus the transport or mixing of the fan-blown air toward the surface gives a velocity gradient outward which blends with the velocity gradient resulting with the mixing between the fan-blown air and the normal local stream above.

The effect of this transport of energy transversely in the boundary layer can be greatly augmented by introducing chordwise vortices, that is, vortices whose plane of rotation is substantially spanwise and which trail downstream much like the tip vortices of the wings.

Figure 5:
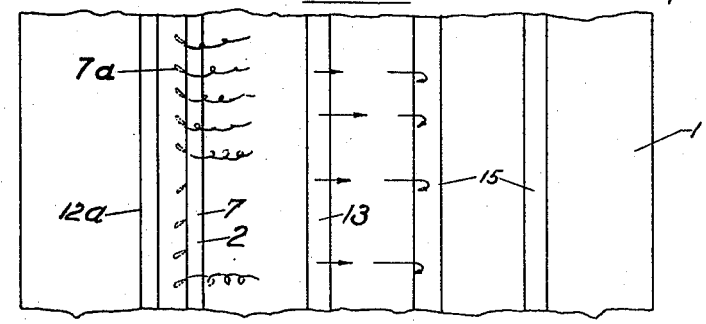
Figure 5 is a fragmentary plan view of the upper surface of the wing.
Figure 6:
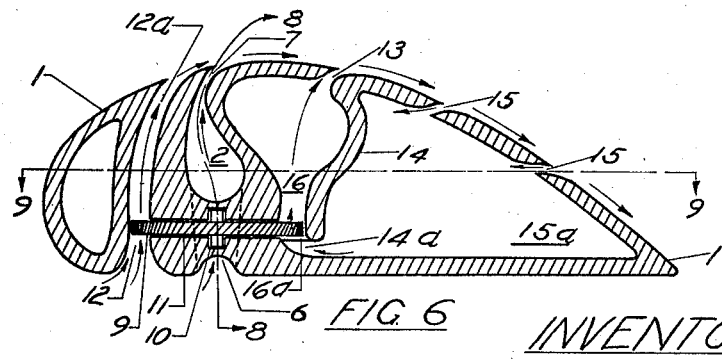
Figure 6 is a vertical cross section along the line 6—6 in Figure 4.

The vortices are produced by small wings or vanes 7a and 13a, Figures 3 and 7, which are set at a small angle about 5° to the direction of flow through the slot. In the wing this will be substantially the chord direction. Since these vanes are transverse to the flow they produce a lift on themselves which results in the formation of the high velocity vortices at their tips. As shown in Figures 3 and 7 these vortices proceed rearward. By their high velocity rotation they produce a vertical mixing which transports energy into the slow moving fluid closest to the wing. These vanes are distributed along the major portion of the span of the wing as indicated in Figures 5 and 11. The latter figure is to be described subsequently. Where several slots are used the vanes of one should be staggered relative to the other.

It should also be noted that the blades of the turbine (or pump) 9 shed tip vortices and that due to their rotation a whole sheet of vortices are discharged. It is particularly significant that the ends of the blades are free or have a gap between them and the walls so that they shed strong vortices.

It will now be clear that in addition to the reduction of the drag of a through slot the combination of through slot and surface slot leads to another unique result of augmenting the lifting capacity and that this result may be further augmented by artificially introducing chordwise vortices. Thus the combination gives a very useful effect for all angles of attack used in flight.

An alternative form of the invention is shown in Figure 10. The wing is 1a and the fan is 9b. The rotation of the fan inducts air at the slot 15 and ejects it at the discharge slot 13. Hence the boundary layer is energized and a high velocity or high energy stratum of air is placed between the wing and the discharge from the through slot 2.

The fan 9b and its shaft 17 are rotated by the gears 18 and 19 and the shaft 20. Shaft 20 is rotatably connected to the shaft of engine 20a through the mediumship of gears and an overrunning clutch in the transmission housing 21. The mechanism has been described in my Patent No. 1,913,644 of June 13, 1933, entitled Means of energizing the boundary layer on aircraft parts. The mechanism is such that the engine can drive both the propeller 22 to propel the airplane and the fan 9b. If the engine fails an overrunning clutch within 21 disengages the engine, and the propeller 22 acting as a windmill drives the fan 9b. A mechanism is also provided to alter the pitch of the propeller to that value best suited to a windmill, which value is usually appreciably less than for propulsion. The alteration of the pitch is accomplished by the crank 23, shaft 24 and chain 25. A suitable mechanism at 26 then rotates the blades. This device is described in the previously mentioned patent.

The significant point is that the engine can rotate the fan 9b so that at high speeds the drag arising from the presence of the through slot is eliminated. In the same instance, upon engine failure, a very high lifting capacity is available from the through slot and this lift is further augmented by the boundary layer energization accomplished by the fan and propeller.

The fan is located about midway between the upper and lower surfaces of the wing in an opening in a partition 27 dividing the wing into the upper and lower compartments 28 and 29 respectively. The induction openings lead into the upper compartment and the discharge slot is in communication with the lower compartment.

The function of the vanes 13a, Figures 10 and 11, has been mentioned above. It is particularly desirable that the vanes 13a be placed near the exit of the discharge slot so that the vortices have the maximum strength upon entering the boundary layer above the wing. By locating them in the smallest cross section the velocity is higher and the vortex correspondingly stronger since the strength is proportional to the square of the velocity.

The vanes 13a are necessary in addition to the tip vortices from the fan 9b because with a central fan discharging through a long spanwise slot the fan tip vortices are largely lost and disorganized and could not serve so long a wing expanse with a dense enough vorticity.

Of the two means of driving the fan for the energization of the air the second method is the more readily adaptable to present-day airplane wing construction and engines and for this reason I prefer it.

Figure 11 shows the wing 1a on the fuselage 30.

For purposes of exposition of the invention I have laid chief stress on the energization of the fan blown jet; but the introduction of turbulence into the airstream above the wing when the boundary layer is removed by suction is equally important.

When the boundary layer is drawn into the wing by suction the next adjacent stream is drawn down on to the wing surface. This stream is originally streamline and possesses no turbulence since it then lies outside the boundary layer. Hence upon being drawn down upon the wing surface it does not have within itself the fine texture turbulence necessary to continuously transfer momentum to the air particles in contact with the wing surface. The proper turbulence must be introduced and this continuously because the boundary layer as it forms is being continuously drawn into the wing. This fine texture turbulence is best introduced by the flow arising from the presence of the through slot and the vanes.

With the through slot present ahead of the suction slot, the spanwise vortices constituting the fine turbulence rolled up or created by the flow about the nose are separated from the wing surface by the sheet of fluid flowing through the through slot. The boundary layer is adjacent the wing surface and when it is inducted into the wing the vortices on the upper side of the fluid sheet come nearer the wing and persist even to the rear of the induction slot.

The invention is not limited to wings for supporting aircraft but finds application in pump blades and other bodies bathed by a relative flow of fluid. For instance the flow in conduits and about automobiles may be made to conform to the surface of the walls by boundary layer energization and it is important to introduce turbulence into the energizing flow to obtain the best efficiency.

I have used the term fine texture turbulence to distinguish the relatively stable rotations in the boundary layer from the violent and large unstable oscillations occurring in the flow above a wing or behind a body when the separation of the normal streamline flow from the body occurs.

The fine texture turbulence is a quite systematic distribution of rotating fluid masses while the turbulence occurring after separation is heterogeneous and highly unsystematic, varying greatly from instant to instant.

The openings or slots for boundary layer energization should extend along the surface transversely to the local flow on the body surface for the most efficient effect. Also the slot should serve an appreciable area of the body surface if an appreciable change in the magnitude of the aerodynamic force on the body is sought. Instead of a slot, of course, a distributed set of openings of any shape may be used. I use the term aerodynamic in a broad sense to include and describe hydrodynamic and other fluid dynamic phenomena.

While the form of apparatus herein described constitutes a preferred embodiment of the invention it is to be understood that the invention is not limited to these precise forms of apparatus and that changes may be made therein without departing from the scope of the invention which is defined in the appended claims.

I claim:

1. In an aircraft, a wing associated with a relative flow of air and having a through slot for the passage of air at high and low angles of attack between the under surface and the upper surface, said slot extending along the major portion of the semi-span and providing a desirable high lifting capacity of the wing at large angles of attack but an undesirable drag at the said low angles of attack, and means to reduce the undesirable drag comprising a perforated upper surface of the wing to form a spanwise slot leading into the wing interior, and a means of pumping in communication with said slot to cause a flow therethrough to energize the boundary layer.

2. In a wing associated with a relative flow of air, walls spaced apart extending spanwise along a major portion of the semi-span and through the wing to form a through slot to convey the relative flow of air between the upper and lower surfaces at high and low angles of attack, said through slot giving rise to a desirable high lift at large angles of attack and an undesirable high drag at low angles of attack, and means to reduce the said undesirable drag comprising a perforated upper surface of the portion of the wing aft of said through slot to form an induction opening and a discharge slot, and a means of pumping in communication with said induction opening and discharge slot to cause a flow through them to energize the boundary layer and the low energy air passing through the slot.

3. In a wing associated with a relative flow of air, walls spaced apart extending spanwise along a major portion of the semi-span and through the wing to form a through slot to convey the relative flow of air between the upper and lower sides at high and low angles of attack, said through slot giving rise to a desirable high lift at large angles of attack and an undesirable high drag at low angles of attack, and means to reduce the said undesirable drag comprising a perforated upper surface of the wing to form an induction slot leading into the wing interior in the portion of the wing aft of the said through slot, and a means of pumping in communication with the induction slot to cause an inflow of the boundary layer arising from the relative flow.

4. In a wing associated with a relative flow of air, walls spaced apart extending spanwise along a major portion of the semi-span and through the wing to form a through slot to convey the relative flow of air between the upper and lower surfaces at high and low angles of attack, said through slot giving rise to a desirable high lift at large angles of attack and an undesirable high drag at low angles of attack, and means to reduce the said undesirable drag comprising a perforated upper surface of the wing to form a rearward directed discharge slot for the discharge of air along the wing surface, and a means of pumping in communication with the discharge slot to cause an outward flow therethrough.

5. In a wing associated with a relative flow of air, walls spaced apart extending spanwise along a major portion of the semi-span and through the wing to form a through slot to convey the relative flow of air between the upper and lower surfaces at high and low angles of attack, said through slot giving rise to a desirable high lift at large angles of attack and an undesirable high drag at low angles of attack, and means to reduce the said undesirable drag comprising a perforated upper surface of the wing to form an induction slot for the intake of the boundary layer, and a means of pumping in communication with the said induction slot to cause the induction of the boundary layer.

6. In a wing associated with a relative flow of air and having a passage from the under surface to the upper surface, a prime mover in the passage and actuated by the flow of air therethrough, a perforated surface of the wing to form an opening in communication with the wing interior, a means of pumping in communication with said surface opening and driven by said prime mover to cause a flow through said opening, and walls spaced apart to form a through slot from the under surface to the upper surface to convey air of the relative flow to the upper surface to the rear of the said passage to energize the deenergized air from the prime mover.

7. In combination, a wing associated with a relative wind and having a perforated upper surface to form a spanwise surface slot in communication with the wing interior, a means of blowing to discharge a fluid jet through said surface slot to energize the boundary layer to augment the maximum lifting capacity, and means to increase the degree of lift augmentation for a given energy in said jet comprising walls spaced apart and extending along the span to form a through slot in the wing to convey the relative wind from below to above the wing, said slot serving to introduce mixing turbulence of fine texture into said jet from the surface slot to augment the effect of said jet in energizing the boundary layer.

8. In combination, a wing associated with a relative wind and having a perforated upper surface to form a spanwise slot in communication with the wing interior, a means of pumping to cause an inward flow of the boundary layer to bring the high energy air of the relative flow normally above the boundary layer close to the wing whereby the boundary layer is continuously replaced by a new layer of higher energy content so as to augment the maximum lifting capacity, and means to introduce into this new layer a turbulence of fine texture to transport energy into the air very close to the wing surface and thereby preclude the formation of yet another boundary layer, said means comprising walls spaced apart and extending along the wing to form a through slot to convey the relative wind from below to above the wing and modifying the flow over the portion of the wing ahead of the through slot.

9. In a wing associated with a relative flow of fluid, walls spaced apart and extending along a major portion of the semi-span to form a through slot to convey the relative flow from below to above the wing, said flow through the through slot serving to augment the maximum lifting capacity, and a plurality of vanes projecting into the flow through the through slot to create turbulence therein.

10. In a wing associated with a relative flow of fluid, a perforated surface to form a slot extending along a major portion of the semi-span for the emission of a fluid flow to energize the boundary layer, means to provide the said flow to energize the boundary layer, and a plurality of vanes disposed along the span and projecting into the last said flow to create turbulence therein.

11. In combination, a body wetted by a relative flow of fluid and having a perforated side wall to form an opening extending along a major portion of the wall of said body and transverse to the flow and suitable for use in boundary layer energization, means to provide an energizing flow through said opening, and an element projecting into the said flow to create turbulence therein downstream from the means to provide the energizing flow.

12. In combination, a body wetted by a relative flow of fluid and having a perforated side wall to form an opening extending along the wall transverse to the direction of flow and suitable for use in energizing the boundary layer, means to provide an energizing flow through said opening rearward along the body surface, and a vane sufficiently within said body to be shielded from the said relative flow, said vane projecting into the energizing flow and having an end sufficiently free to give rise to a vortex in the energizing flow to improve the energization of the boundary layer.

13. In combination, a wing having a passage within and a perforated surface of the wing to form a spanwise slot in communication with the wing interior by means of a said passage, and an impeller having blades rotatable about an axis and projecting into the passage to cause a flow therein for discharge from said slot, said impeller having blade tips located in and sufficiently free to create vortices in the passage flow to aid in the energization of the boundary layer of the wing.

14. In combination, a wing having a passage within and a perforated surface of the wing to form a spanwise slot in communication with the wing interior by means of said passage, and an impeller having blades rotatable about an axis and projecting into the passage to cause a flow for discharge from said slot, said impeller blades being rotatable about an axis lying outside the said passage.

15. In combination, a wing having a passage within and a perforated surface of the wing to form a spanwise slot in communication with the wing interior by means of said passage, and a plurality of impellers having blades rotatable about an axis and projecting into the passage to cause a flow for discharge from said slot, said plurality of impellers being distributed along a major portion of the semi-span of the wings.

EDWARD A. STALKER.